US012748477B2

(12) United States Patent
Yu

(10) Patent No.: US 12,748,477 B2
(45) Date of Patent: Sep. 29, 2026

(54) MULTI-BATTERY ELECTRONIC DEVICE AND PROTECTION METHOD THEREOF

(71) Applicant: Getac Technology Corporation, New Taipei City (TW)

(72) Inventor: Wen-Huan Yu, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 122 days.

(21) Appl. No.: 18/739,453

(22) Filed: Jun. 11, 2024

(65) Prior Publication Data

US 2025/0044855 A1 Feb. 6, 2025

(30) Foreign Application Priority Data

Aug. 1, 2023 (CN) ........................ 202310959897.X

(51) Int. Cl.

| | |
|---|---|
| ***G06F 1/00*** | (2006.01) |
| ***G06F 1/3212*** | (2019.01) |
| ***G06F 1/3296*** | (2019.01) |
| ***H02J 7/00*** | (2006.01) |
| ***H02J 7/50*** | (2026.01) |
| ***H02J 7/80*** | (2026.01) |

(52) U.S. Cl.

CPC .......... *G06F 1/3212* (2013.01); *G06F 1/3296* (2013.01); *H02J 7/50* (2026.01); *H02J 7/80* (2026.01); *H02J 7/855* (2026.01)

(58) Field of Classification Search

CPC ............................. G06F 1/3296; G06F 1/3212
See application file for complete search history.

(56) References Cited

U.S. PATENT DOCUMENTS

| | | | | |
|---|---|---|---|---|
| 9,735,592 | B2 | 8/2017 | Yoshida | |
| 10,270,262 | B2 | 4/2019 | Kim et al. | |
| 10,355,584 | B1 * | 7/2019 | Oak | H02M 3/158 |
| RE50,619 | E * | 10/2025 | Lei | H02J 1/122 |
| 2004/0070371 | A1 * | 4/2004 | Chern | G06F 1/3203 320/136 |

(Continued)

FOREIGN PATENT DOCUMENTS

| | | | |
|---|---|---|---|
| CN | 104145398 | B | 4/2017 |
| CN | 106899055 | B | 1/2022 |

(Continued)

OTHER PUBLICATIONS

Search Report issued on Nov. 6, 2024 for EP application No. 24185649.1, 9 pages.

*Primary Examiner* — Mohammed H Rehman
(74) *Attorney, Agent, or Firm* — Cooper Legal Group, LLC

(57) ABSTRACT

A multi-battery electronic device and a protection method thereof are provided. The multi-battery electronic device includes a plurality of batteries, a plurality of battery detectors, and a control circuit. The plurality of battery detectors are connected to the plurality of batteries, respectively. The control circuit is configured to detect battery status of the plurality of batteries by the plurality of battery detectors, respectively. When the control circuit determines that a current capacity difference between any two of the plurality of batteries is greater than a capacity difference threshold, the control circuit controls the multi-battery electronic device to enter a load reduction mode.

17 Claims, 10 Drawing Sheets

(56) References Cited

U.S. PATENT DOCUMENTS

| | | | | |
|---|---|---|---|---|
| 2004/0148115 | A1* | 7/2004 | Ching | G06F 1/3246 702/63 |
| 2004/0236969 | A1* | 11/2004 | Lippert | G06F 1/30 713/300 |
| 2008/0157721 | A1* | 7/2008 | Kaneko | H02J 7/52 320/136 |
| 2009/0193277 | A1* | 7/2009 | Chueh | G06F 1/28 713/340 |
| 2015/0293569 | A1* | 10/2015 | Yu | H02J 7/00036 713/300 |
| 2017/0331305 | A1* | 11/2017 | Xiang | H02J 7/63 |
| 2019/0165439 | A1* | 5/2019 | Hirose | H01M 10/44 |
| 2019/0363566 | A1 | 11/2019 | Yen | |
| 2020/0127464 | A1* | 4/2020 | Gagne | H02J 7/44 |
| 2021/0135478 | A1 | 5/2021 | Schline et al. | |
| 2021/0143650 | A1 | 5/2021 | Wang et al. | |
| 2022/0074995 | A1* | 3/2022 | Bharathraj | B60L 58/12 |
| 2022/0147953 | A1* | 5/2022 | Audino | B65F 1/004 |
| 2022/0212561 | A1* | 7/2022 | Tabatowski-Bush | B60L 58/12 |
| 2023/0035145 | A1* | 2/2023 | Yan | B60L 58/12 |
| 2023/0138447 | A1* | 5/2023 | Ko | G01K 7/22 320/134 |

FOREIGN PATENT DOCUMENTS

| | | | |
|---|---|---|---|
| CN | 111240458 | B | 9/2022 |
| CN | 112976995 | B | 1/2023 |
| TW | 202005161 | A | 1/2020 |

* cited by examiner

MULTI-BATTERY ELECTRONIC DEVICE AND PROTECTION METHOD THEREOF

CROSS-REFERENCE TO RELATED PATENT APPLICATION

This application claims the benefit of priority to China Patent Application No. 202310959897.X, filed on Aug. 1, 2023, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and a protection method thereof, and more particularly to an electronic device that supports multiple batteries and a protection method thereof.

BACKGROUND OF THE DISCLOSURE

Conventionally, only a single charger and a single battery are disposed in an interior of a computer device. When the computer device is equipped with a high-performance video graphics adapter, a system power consumption of the computer device can sometimes be as high as 400 watts (W). Since an output power of the single battery is only about 70 watts, the power of the computer device is very likely to be instantaneously interrupted, which may even cause damage to the battery.

SUMMARY OF THE DISCLOSURE

In response to the above-referenced technical inadequacies, the present disclosure provides a multi-battery electronic device and a protection method thereof.

In order to solve the above-mentioned problems, one of the technical aspects adopted by the present disclosure is to provide a multi-battery electronic device, which includes a plurality of batteries, a plurality of battery detectors, and a control circuit. The plurality of battery detectors are connected to the plurality of batteries, respectively. The control circuit is configured to detect battery status of the plurality of batteries by the plurality of battery detectors. When the control circuit determines that a current capacity difference between any two of the plurality of batteries is greater than a capacity difference threshold, the control circuit controls the multi-battery electronic device to enter a load reduction mode.

In order to solve the above-mentioned problems, another one of the technical aspects adopted by the present disclosure is to provide a protection method of a multi-battery electronic device. The protection method includes configuring a control circuit to perform following: detecting battery status of a plurality of batteries by a plurality of battery detectors, respectively; determining whether or not a current capacity difference between any two of the plurality of batteries is greater than a capacity difference threshold; and controlling, when the current capacity difference between any two of the plurality of batteries is determined to be greater than the capacity difference threshold, the control circuit controls the multi-battery electronic device to enter a load reduction mode.

Therefore, in the multi-battery electronic device and the protection method thereof provided by the present disclosure, as long as the capacity difference between any two of plurality of batteries is abnormal, the multi-battery electronic device will be controlled to immediately enter the load reduction mode, so as to prevent the power of the batteries from being exhausted by a load.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
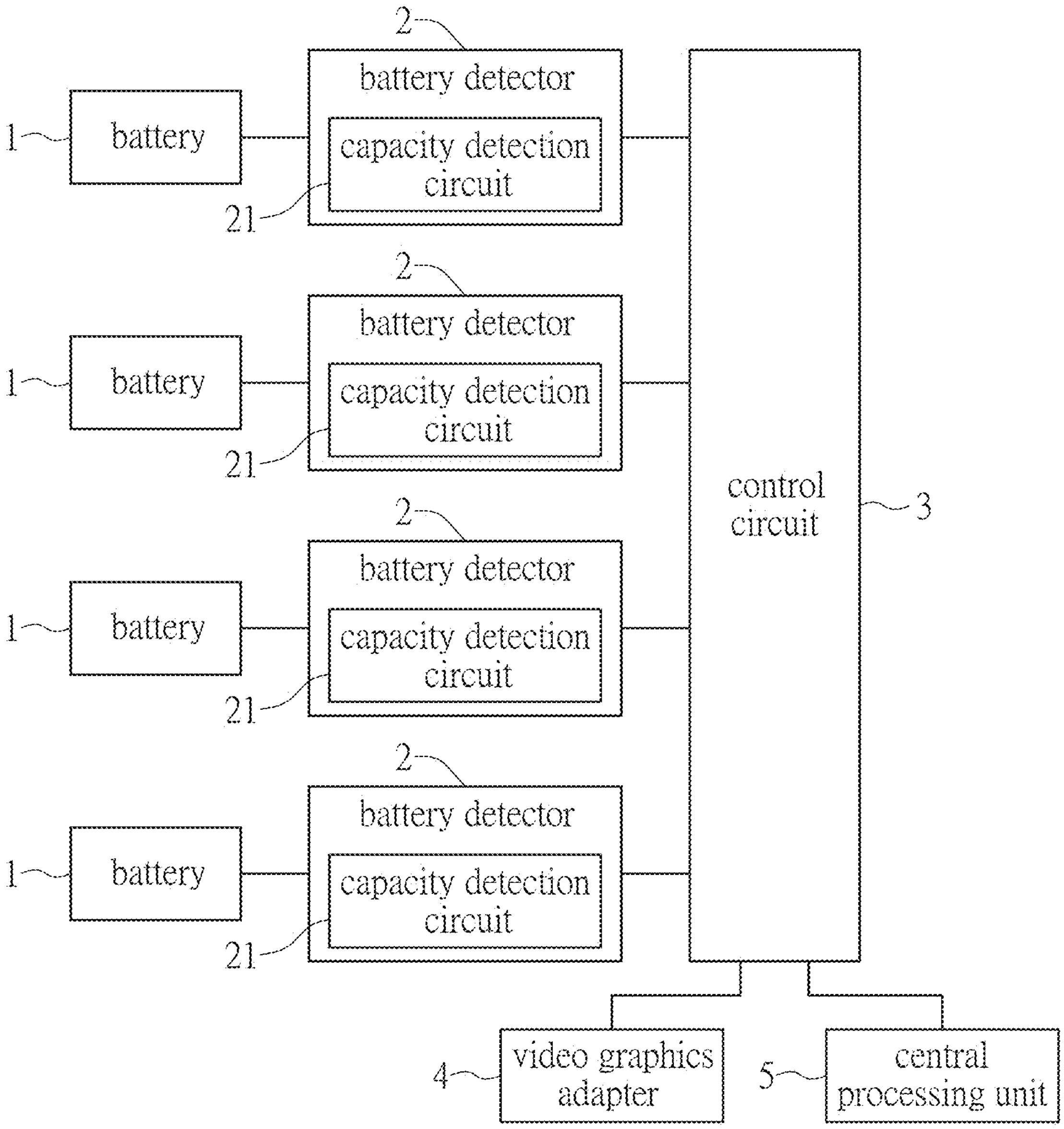
FIG. 1 is a functional block diagram of a multi-battery electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a multi-battery electronic device according to a first embodiment of the present disclosure. Referring to FIG. 1, the multi-battery electronic device includes a plurality of batteries 1, a plurality of battery detectors 2, and a control circuit 3. The plurality of battery detectors 2 are connected to the plurality of batteries 1, respectively, so as to detect battery status of the plurality of batteries 1, respectively. The control circuit 3 can be implemented by, for example, one or more of a micro-control unit, a system on a chip, a programmable logic array, and a field programmable logic array. The control circuit 3 is electrically connected to the plurality of battery detectors 2 for obtaining the battery status. The control circuit 3 is further electrically connected to various loads of the multi-battery electronic device, so as to control an operating frequency of each of the loads.

When a task processed by the multi-battery electronic device becomes more complex and requires more system resources, a power consumption of the load increases accordingly. For example, power consumption settings of a central processing unit (CPU) include a first power limit PL1, a second power limit PL2, a third power limit PL3, a fourth power limit PL4, and other power consumption levels. The first power limit PL1 usually represents thermal design power consumption, and the second power limit PL2 represents a short-term power consumption, which is suitable for a full load operation or an overclocking state at an accelerated boost frequency (that is, the highest power consumption that can be achieved when the CPU operates at a high clock). Therefore, the second power limit PL2 is usually greater than the first power limit PL1, and the third power limit PL3 and the fourth power limit PL4 are modes with higher power consumptions.

Each of the plurality of battery detectors 2 includes a capacity detection circuit 21. Each of the capacity detection circuits 21 is used to detect a current capacity of the corresponding battery 1. The control circuit 3 obtains the current capacities of the plurality of batteries 1 by the plurality of capacity detection circuits 21, respectively. The control circuit 3 determines whether or not a current capacity difference between any two of the plurality of batteries 1 is greater than a capacity difference threshold.

When the current capacity difference between any two of the plurality of batteries 1 is greater than the capacity difference threshold, the control circuit 3 enables the multi-battery electronic device to enter a load reduction mode, and the plurality of battery detectors 2 continue to detect the capacity status of each of the plurality of batteries 1.

When the current capacity differences between the plurality of batteries 1 are not greater than the capacity difference threshold, the multi-battery electronic device stays in a normal mode, and each of the plurality of battery detectors 2 continues to detect the capacity status of the corresponding battery 1.

Figure 2:
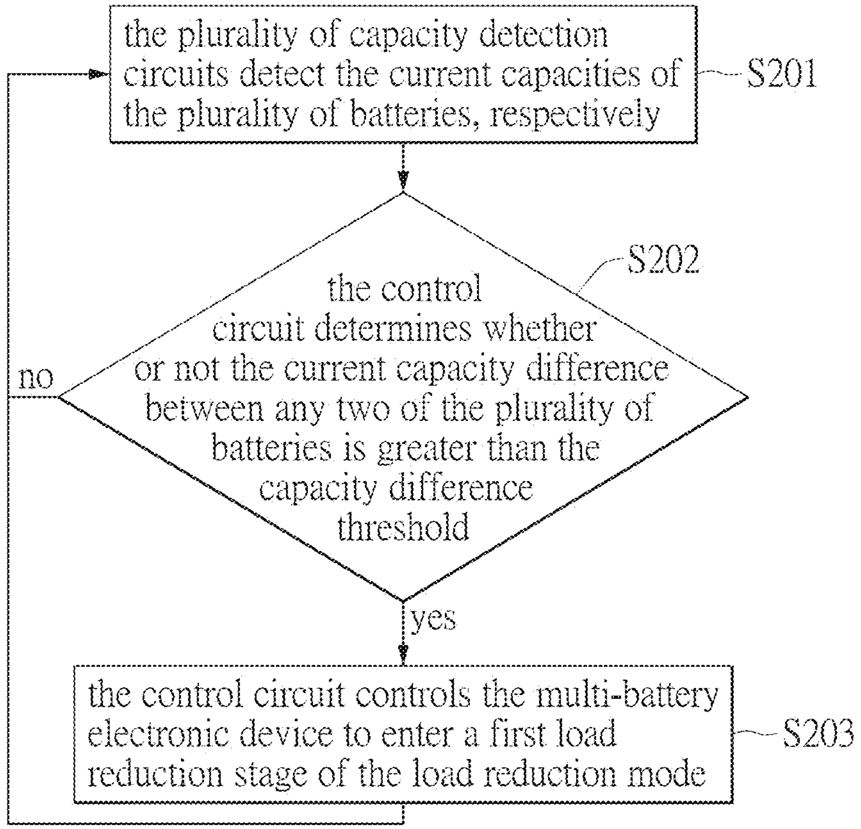
FIG. 2 is a flowchart of a protection method that is applicable to the multi-battery electronic device of FIG. 1.

FIG. 2 is a flowchart of a protection method that is applicable to the multi-battery electronic device of FIG. 1, and the protection method of FIG. 2 includes configuring the control circuit 3 to perform the following steps. In step S201, the plurality of capacity detection circuits 21 detect the current capacities of the plurality of batteries 1, respectively.

In step S202, the control circuit 3 determines whether or not the current capacity difference between any two of the plurality of batteries 1 is greater than the capacity difference threshold.

When the current capacity difference between any two of the plurality of batteries 1 is greater than the capacity difference threshold, step S202 is followed by step S203.

When the current capacity differences between the plurality of batteries 1 are not greater than the capacity difference threshold, the protection method returns to step S201.

In step S203, the control circuit 3 controls the multi-battery electronic device to enter a first load reduction stage of the load reduction mode and then the protection method returns to step S201.

Specifically, the load reduction mode includes the first load reduction stage and a second load reduction stage. When the control circuit 3 reduces an operating frequency of a video graphics adapter 4, the multi-battery electronic device enters the first load reduction stage of the load reduction mode.

When the control circuit 3 reduces the operating frequency of the video graphics adapter 4 and an operating frequency of a central processing unit 5 at the same time, the multi-battery electronic device enters the second load reduction stage of the load reduction mode.

For example, in the normal mode, the first power limit PL1, the second power limit PL2, and the fourth power limit PL4 of the central processing unit 5 are 45 W, 109 W, and 109 W, respectively.

In the first load reduction stage of the load reduction mode, the first power limit PL1, the second power limit PL2, and the fourth power limit PL4 of the CPU 5 are 10 W, 10 W, and 109 W, respectively.

In the second load reduction stage of the load reduction mode, the first power limit PL1, the second power limit PL2, and the fourth power limit PL4 of the CPU 5 are 6.5 W, 6.5 W, and 109 W, respectively.

Through the protection method of FIG. 2, as long as the capacity difference between any two of the batteries 1 is abnormal, the load will be reduced immediately, so as to prevent the power of the batteries 1 from being exhausted by the load.

Figure 3:
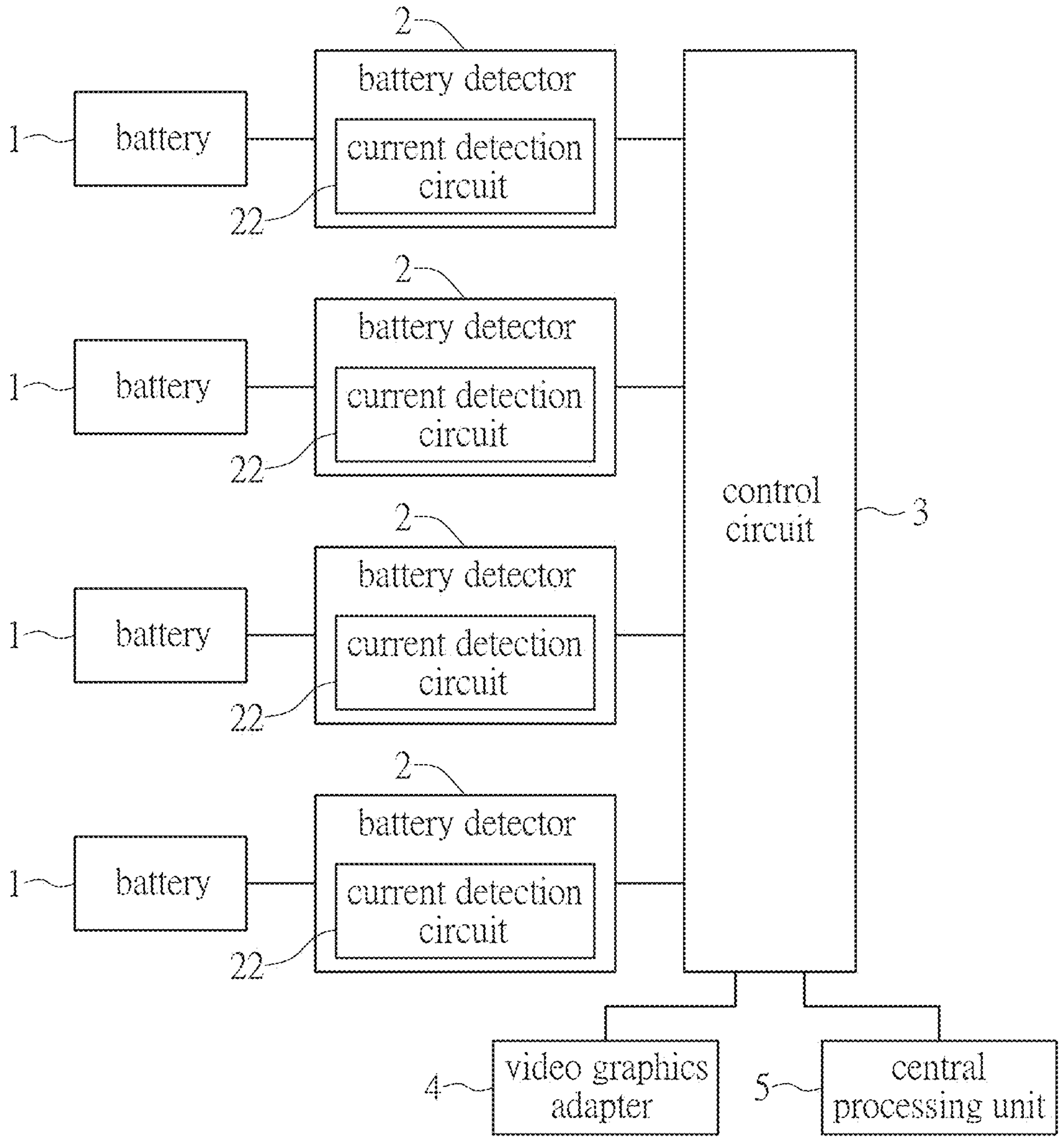
FIG. 3 is a functional block diagram of a multi-battery electronic device according to a second embodiment of the present disclosure.

FIG. 3 is a functional block diagram of a multi-battery electronic device according to a second embodiment of the present disclosure. Compared with FIG. 1, each of the plurality of battery detectors 2 of FIG. 3 includes a current detection circuit 22. Each of current detection circuits 22 is used to detect a discharge current of the corresponding battery 1, and the control circuit 3 obtains the discharge currents of the plurality of batteries 1 by the plurality of current detection circuits 22, respectively.

When the control circuit 3 determines that the discharge current of any one of the plurality of batteries 1 is greater than a current upper limit, the control circuit 3 controls the multi-battery electronic device to enter the load reduction mode, and each of the plurality of battery detectors 2 continues to detect the discharge current of the corresponding battery 1.

When the control circuit 3 determines that the discharge currents of the plurality of batteries 1 are not greater than the current upper limit, the multi-battery electronic device stays in the normal mode, and each of the plurality of battery detectors 2 continues to detect the discharge current of the corresponding battery 1.

Figure 4:
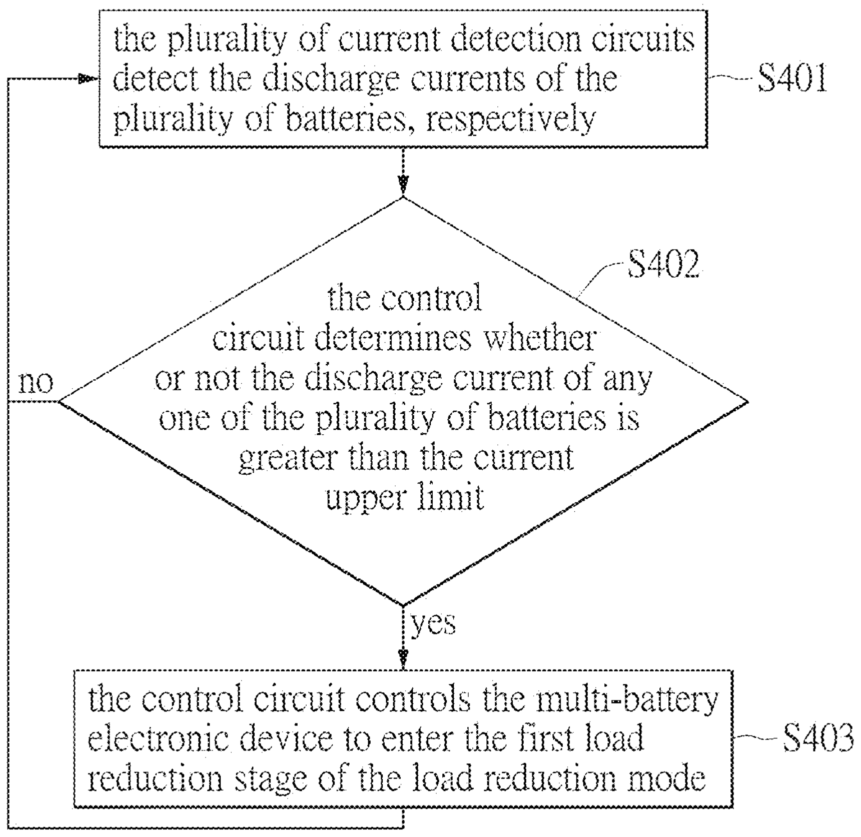
FIG. 4 is a flowchart of a protection method that is applicable to the multi-battery electronic device of FIG. 3.

FIG. 4 is a flowchart of a protection method that is applicable to the multi-battery electronic device of FIG. 3, and the protection method of FIG. 4 includes configuring the control circuit 3 to perform the following steps.

In step S401, the plurality of current detection circuits 22 detect the discharge currents of the plurality of batteries 1, respectively.

In step S402, the control circuit 3 determines whether or not the discharge current of any one of the plurality of batteries 1 is greater than the current upper limit.

When the discharge current of any one of the plurality of batteries 1 is greater than the current upper limit, step S402 is followed by step S403.

When the discharge currents of the plurality of batteries 1 are not greater than the current upper limit, the protection method returns to step S401.

In step S403, the control circuit 3 controls the multi-battery electronic device to enter the first load reduction stage of the load reduction mode and then the protection method returns to step S401.

For example, the current upper limit is set to be 6 amps (A). When the control circuit 3 determines that the discharge current of any one of the plurality of batteries 1 is greater than 6 amps, the control circuit 3 reduces the operating frequency of the video graphics adapter 4, so that the multi-battery electronic enters the first load reduction stage of the load reduction mode.

Through the protection method of FIG. 4, as long as the discharge current of any one of batteries 1 is abnormal, the load will be reduced immediately, so as to prevent the power of the batteries 1 from being exhausted by the load.

Figure 5:
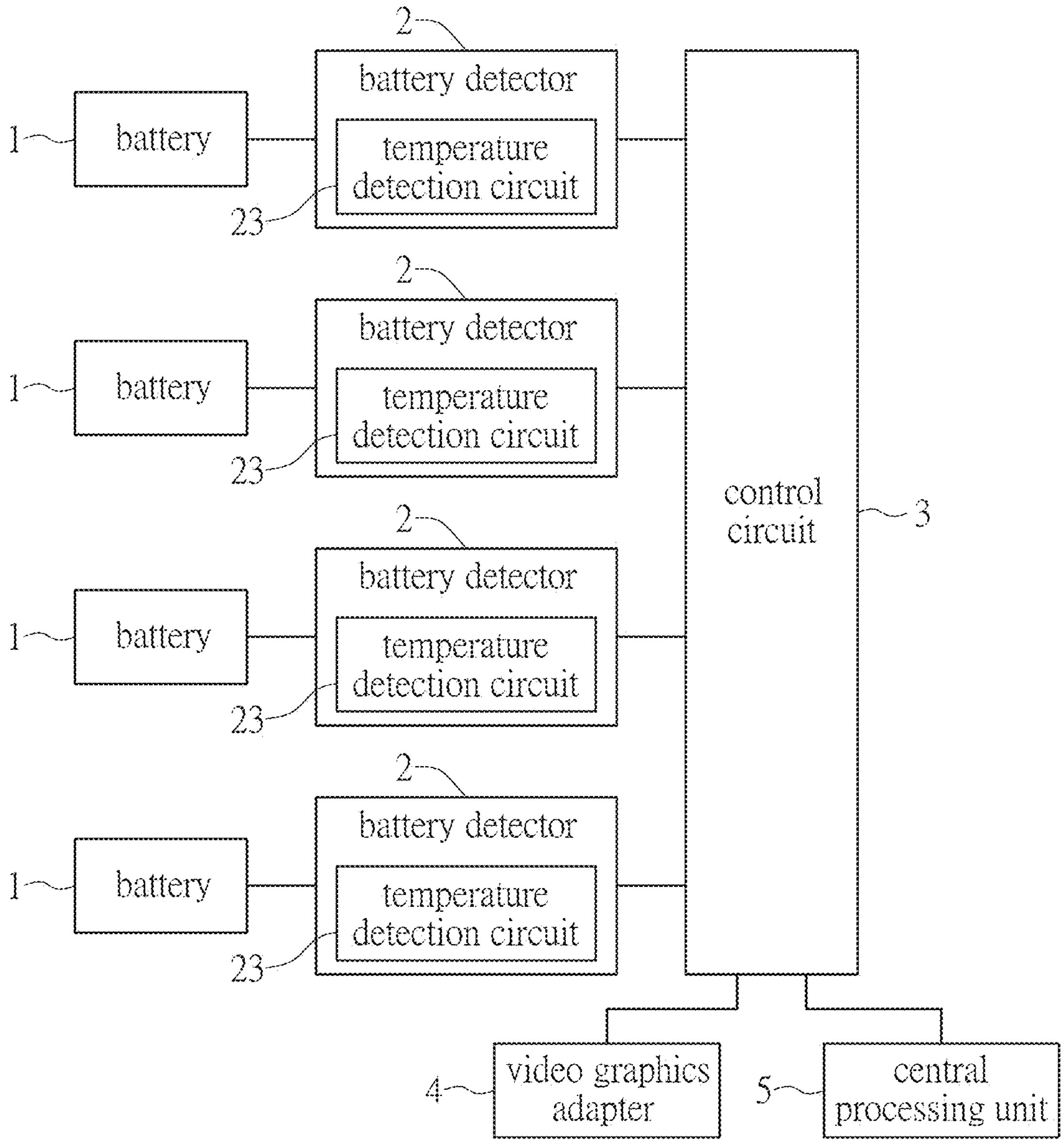
FIG. 5 is a functional block diagram of a multi-battery electronic device according to a third embodiment of the present disclosure.

FIG. 5 is a functional block diagram of a multi-battery electronic device according to a third embodiment of the present disclosure. Compared with FIG. 1, each of the plurality of battery detectors 2 of FIG. 5 includes a temperature detection circuit 23. Each of the temperature detection circuits 23 is used to detect a temperature of the corresponding battery 1, and the control circuit 3 obtains the temperatures of the plurality of batteries 1 by the plurality of temperature detection circuits 23, respectively.

When the control circuit 3 determines that the temperature of any one of the plurality of batteries 1 is not within a temperature protection range, the control circuit 3 controls the multi-battery electronic device to enter the load reduction mode, and then each of the plurality of temperature detection circuits 23 continues to detect the temperature of the corresponding battery 1.

When the control circuit 3 determines that the temperatures of the plurality of batteries 1 are within the temperature protection range, the multi-battery electronic device maintains the normal mode and then each of the plurality of temperature detection circuits 23 continues to detect the temperature of the corresponding battery 1.

Figure 6:
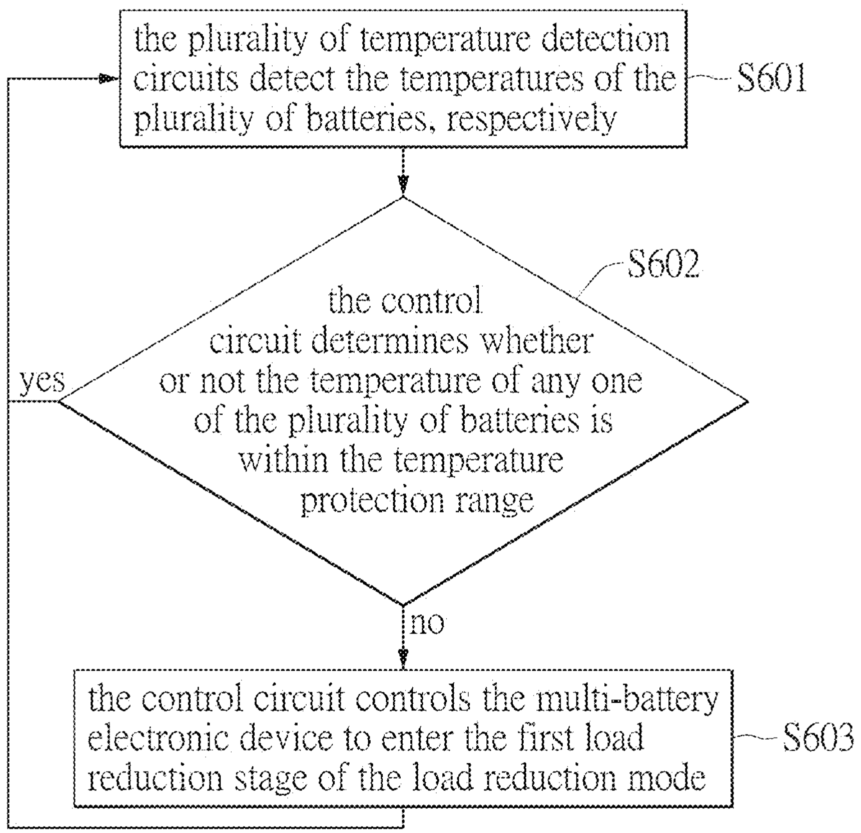
FIG. 6 is a flowchart of a protection method that is applicable to the multi-battery electronic device of FIG. 5.

FIG. 6 is a flowchart of a protection method that is applicable to the multi-battery electronic device of FIG. 5, and the protection method of FIG. 6 includes configuring the control circuit 3 to perform the following steps.

In step S601, the plurality of temperature detection circuits 23 detect the temperatures of the plurality of batteries 1, respectively.

In step S602, the control circuit 3 determines whether or not the temperature of any one of the plurality of batteries 1 is within the temperature protection range.

When the temperatures of the plurality of batteries 1 are within the temperature protection range, the protection method returns to step S601.

When the temperature of any one of the plurality of batteries 1 is not within the temperature protection range, step S602 is followed by step S603.

In step S603, the control circuit 3 controls the multi-battery electronic device to enter the first load reduction stage of the load reduction mode, and then the protection method returns to step S601.

For example, the temperature protection range is from −17° C. to 50° C. When the control circuit 3 determines that the temperature of any one of the plurality of batteries 1 is lower than −17° C. or greater than 50° C., the control circuit 3 reduces the operating frequency of the video graphics adapter 4, so that the multi-battery electronic device enters the first load reduction stage of the load reduction mode.

Through the protection method of FIG. 6, even when the multi-battery electronic device is placed in an extreme climate environment, the batteries 1 can still provide power to the load in a normal manner, so that the load can operate normally.

Figure 7:
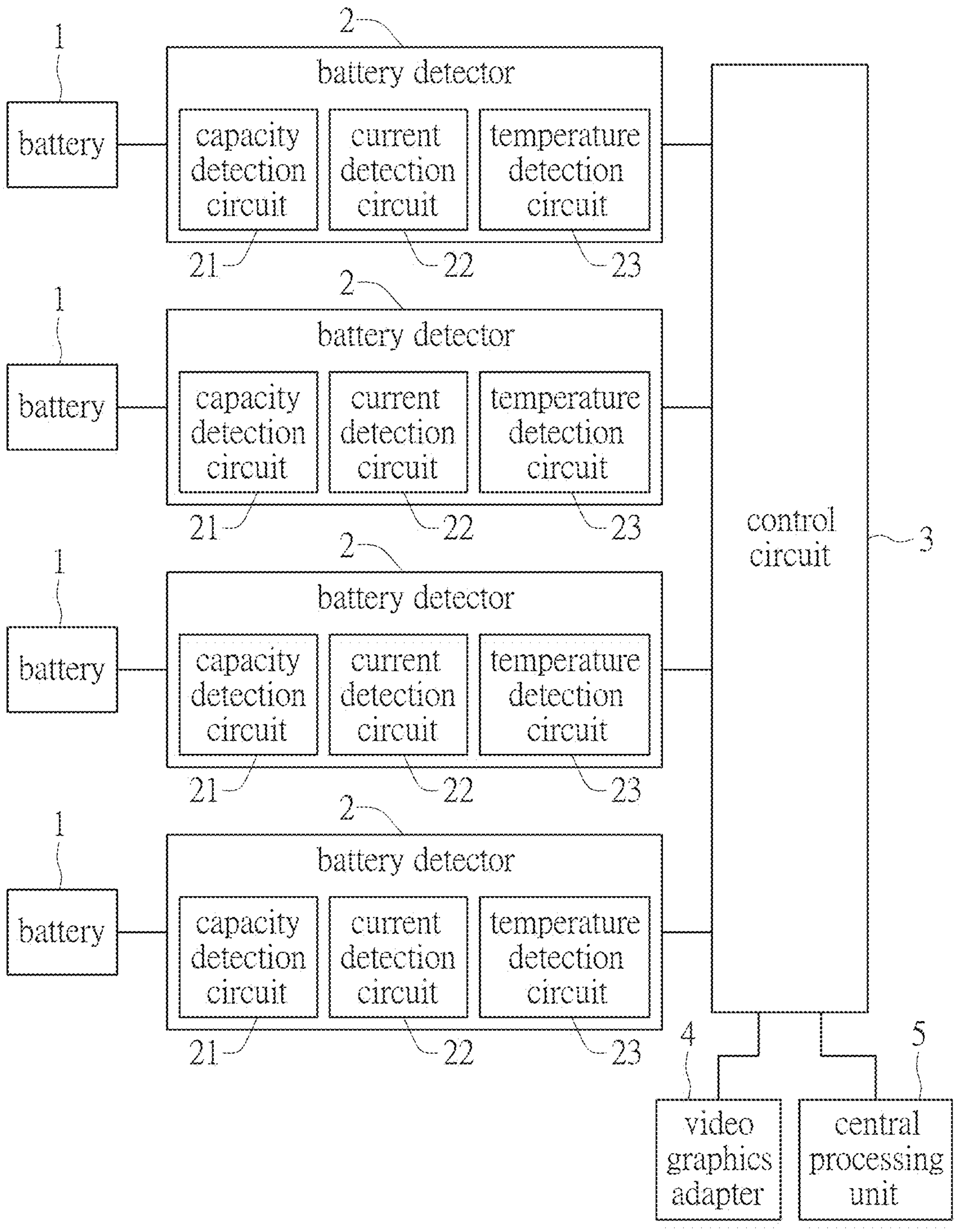
FIG. 7 is a functional block diagram of a multi-battery electronic device according to a fourth embodiment of the present disclosure.

FIG. 7 is a functional block diagram of a multi-battery electronic device according to a fourth embodiment of the present disclosure. Compared with FIG. 1, each of the plurality of battery detectors 2 of FIG. 7 includes the capacity detection circuit 21, the current detection circuit 22, and the temperature detection circuit 23. The capacity detection circuit 21 is used to detect the current capacity of the corresponding battery 1. The current detection circuit 22 is used to detect the discharge current of the corresponding battery 1. The temperature detection circuit 23 is used to detect the temperature of the corresponding battery 1. The control circuit 3 obtains the current capacities, the discharge currents, and the temperatures, respectively from the plurality of capacity detection circuits 21, the plurality of current detection circuits 22, and the plurality of temperature detection circuits 23.

Figure 8:
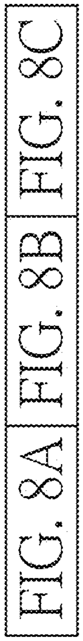
FIG. 8 (FIG. 8A, FIG. 8B and FIG. 8C) is a flowchart of a protection method that is applicable to the multi-battery electronic device of FIG. 7.
Figure 8A:
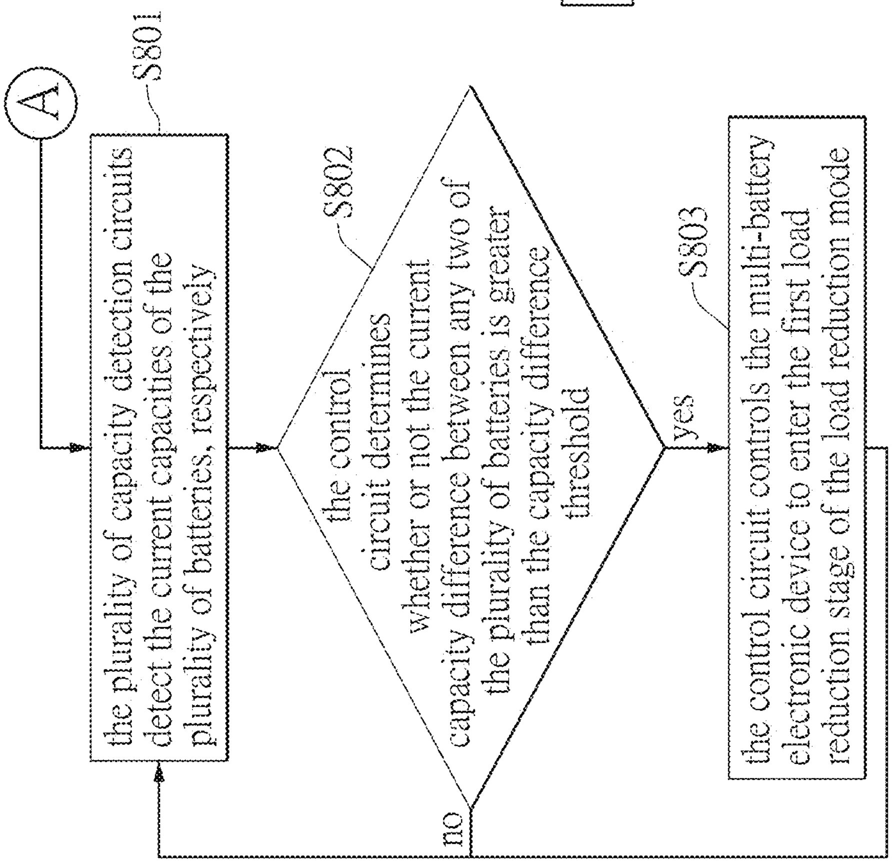
Figure 8B:
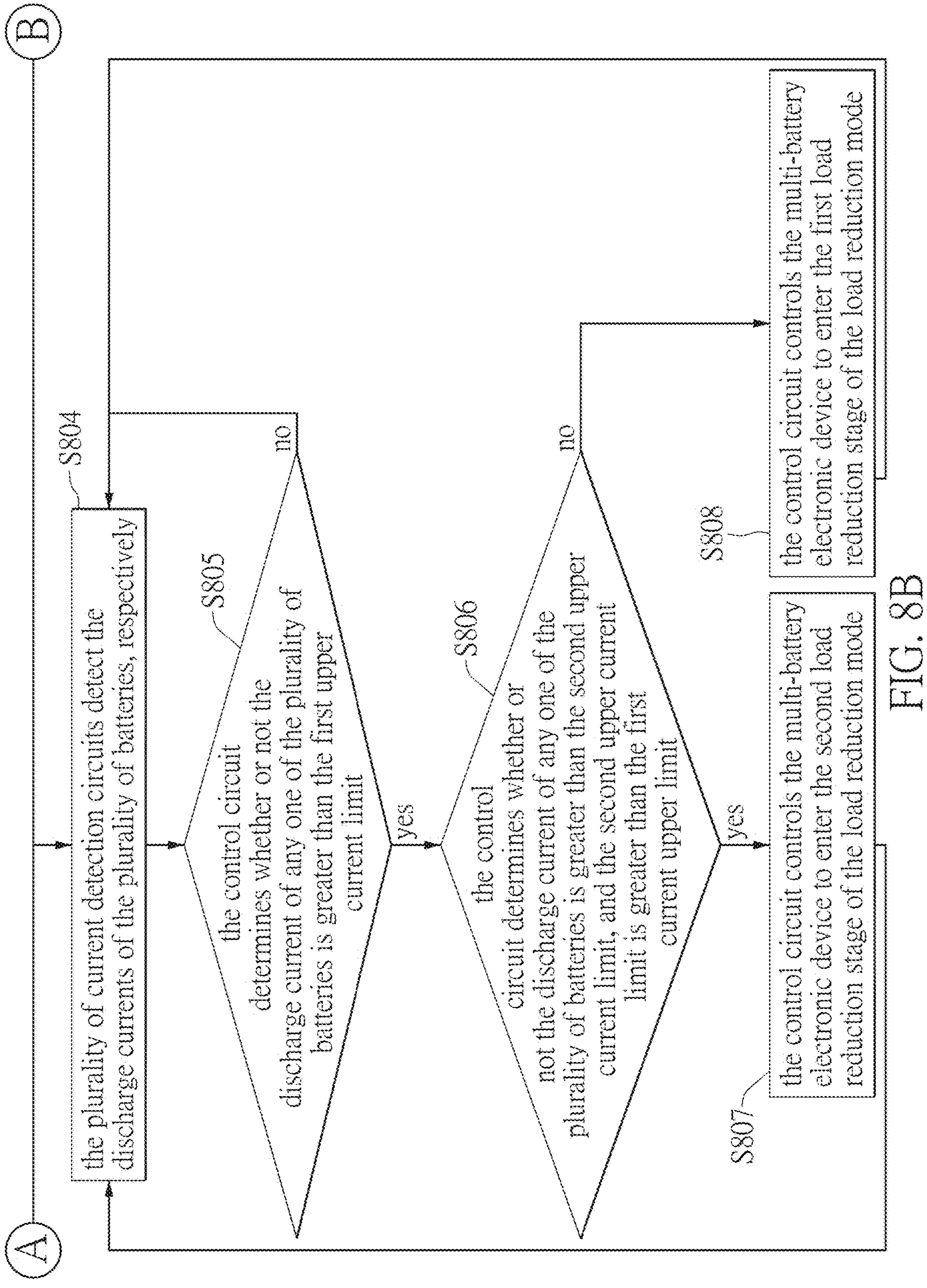
Figure 8C:
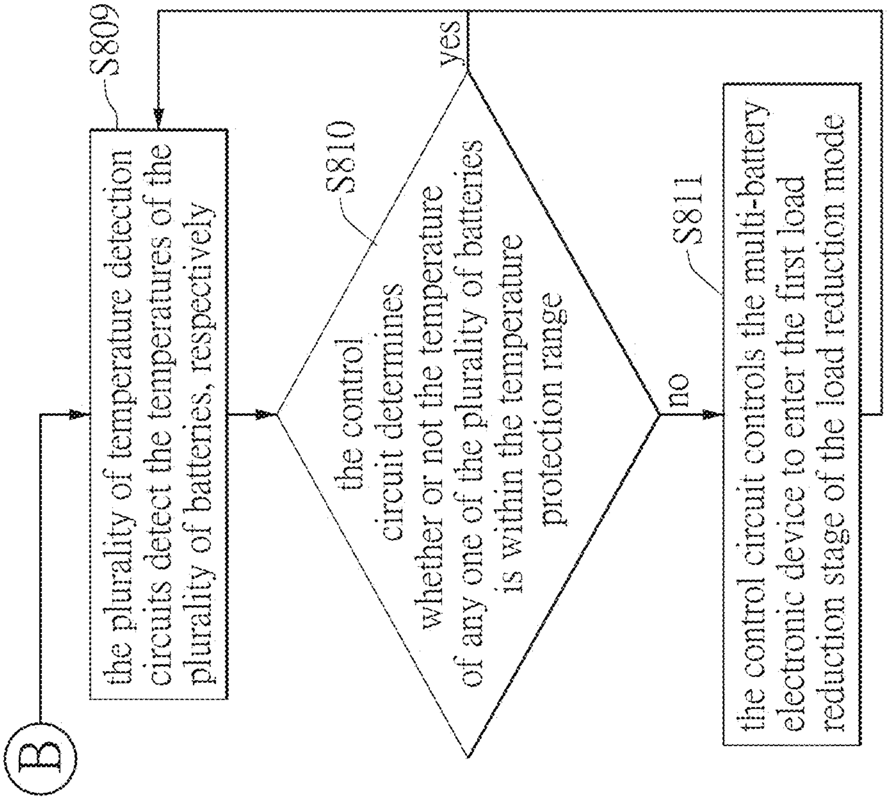

FIG. 8 (FIG. 8A, FIG. 8B and FIG. 8C) is a flowchart of a protection method that is applicable to the multi-battery electronic device of FIG. 7, and the protection method of FIG. 8 includes configuring the control circuit 3 to perform the following steps.

In step S801, the plurality of capacity detection circuits 21 detect the current capacities of the plurality of batteries 1, respectively.

In step S802, the control circuit 3 determines whether or not the current capacity difference between any two of the plurality of batteries 1 is greater than the capacity difference threshold.

When the current capacity difference between any two of the plurality of batteries 1 is greater than the capacity difference threshold, step S802 is followed by step S803.

When the current capacity differences between the plurality of batteries 1 are not greater than the capacity difference threshold, the protection method returns to step S801.

In step S803, the control circuit 3 controls the multi-battery electronic device to enter the first load reduction stage of the load reduction mode, and then the protection method returns to step S801.

In step S804, the plurality of current detection circuits 22 detect the discharge currents of the plurality of batteries 1, respectively.

For example, the control circuit 3 can determine a relationship between the discharge current, a first current upper limit, and a second current upper limit. In this embodiment, the second upper current limit is configured to be greater than the first upper current limit.

In step S805, the control circuit 3 determines whether or not the discharge current of any one of the plurality of batteries 1 is greater than the first upper current limit.

When the discharge current of any one of the plurality of batteries 1 is greater than the first upper current limit, step S805 is followed by step S806.

When the discharge currents of the plurality of batteries 1 are not greater than the first upper current limit, the protection method returns to step S804.

In step S806, the control circuit 3 determines whether or not the discharge current of any one of the plurality of batteries 1 is greater than the second upper current limit, and the second upper current limit is greater than the first current upper limit.

When the discharge current of any one of the plurality of batteries 1 is greater than the second upper current limit, step S806 is followed by step S807.

When the discharge currents of the plurality of batteries 1 are not greater than the second upper current limit, step S806 is followed by step S808.

In step S807, the control circuit 3 controls the multi-battery electronic device to enter the second load reduction stage of the load reduction mode, and then the protection method returns to step S804.

In step S808, the control circuit 3 controls the multi-battery electronic device to enter the first load reduction stage of the load reduction mode, and then the protection method returns to step S804.

For example, the first current upper limit is 4 amps, and the second current upper limit is 7 amps. When the discharge currents of the batteries 1 are lower than 4 amps, the multi-battery electronic device remains in the normal mode. In the normal mode, the first power limit PL1, the second power limit PL2, and the fourth power limit PL4 of the central processing unit 5 are 45 W, 109 W, and 109 W, respectively.

When the discharge current of any one of the plurality of batteries 1 is greater than 4 amps and less than 7 amps, the control circuit 3 reduces the operating frequency of the video graphics adapter 4, so that the multi-battery electronic device enters the first load reduction stage of the load reduction mode.

In the first load reduction stage, the first power limit PL1, the second power limit PL2, and the fourth power limit PL4 of the central processing unit 5 are 10 W, 10 W, and 109 W, respectively.

When the control circuit 3 determines that the discharge current of any one of the plurality of batteries 1 is greater than 7 amps, the control circuit 3 simultaneously reduces the operating frequencies of the video graphics adapter 4 and the central processing unit 5, so that the multi-battery electronic device enters the second load reduction stage of the load reduction mode.

In the second load reduction stage, the first power limit PL1, the second power limit PL2, and the fourth power limit PL4 of the central processing unit 5 are 6.5 W, 6.5 W, and 109 W, respectively.

In step S809, the plurality of temperature detection circuits 23 detect the temperatures of the plurality of batteries 1, respectively.

In step S810, the control circuit 3 determines whether or not the temperature of any one of the plurality of batteries 1 is within the temperature protection range.

When the temperatures of the plurality of batteries 1 are within the temperature protection range, the protection method returns to step S809.

When the temperature of any one of the plurality of batteries 1 is not within the temperature protection range, step S810 is followed by step S811.

In step S811, the control circuit 3 controls the multi-battery electronic device to enter the first load reduction stage of the load reduction mode, and then the protection method returns to step S809.

Furthermore, steps S801, S804 and S809 of FIG. 8 can be performed simultaneously or sequentially.

Through the protection method of FIG. 8, as long as any one of the battery capacity difference, the discharge current, and the temperature is abnormal, the load will be reduced immediately, so as to prevent the power of the batteries 1 from being exhausted by the load and enable the load to operate normally.

In conclusion, in the multi-battery electronic device and the protection method thereof provided by the present disclosure, as long as any one of the battery capacity difference, the discharge current, and the temperature is abnormal, the load will be reduced immediately, so as to prevent battery power from being exhausted by the load and enable the load to operate normally.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-battery electronic device, comprising:

a plurality of batteries;

a plurality of battery detectors connected to the plurality of batteries, respectively, wherein each of the plurality of battery detectors comprises:

a capacity detection circuit configured to detect a current capacity of a corresponding one of the plurality of batteries;

a current detection circuit configured to detect a discharge current of a corresponding one of the plurality of batteries; and a temperature detection circuit configured to detect a temperature of a corresponding one of the plurality of batteries; and a control circuit, wherein the control circuit is configured to detect battery status of the plurality of batteries by the plurality of battery detectors;

wherein the control circuit controls the multi-battery electronic device to enter a load reduction mode when any of the following occurs:

a current capacity difference between any two of the plurality of batteries is greater than a capacity difference threshold based upon the current capacity detected for each of the plurality of batteries;

the discharge current of any one of the plurality of batteries is greater than a current upper limit; or the temperature of any one of the plurality of batteries is not within a temperature protection range; and wherein the load reduction mode comprises changing an operating frequency of at least some of a load.

2. The multi-battery electronic device according to claim 1, further comprising a central processing unit and a video graphics adapter;

wherein, when the multi-battery electronic device enters the load reduction mode, an operating frequency of at least one of the central processing unit or the video graphics adapter is reduced.

3. The multi-battery electronic device according to claim 1, further comprising a central processing unit and a video graphics adapter;

wherein the load reduction mode comprises a first load reduction stage and a second load reduction stage, an operating frequency of the video graphics adapter is reduced in the first load reduction stage, and the operating frequency of the video graphics adapter and an operating frequency of the central processing unit are reduced in the second load reduction stage.

4. The multi-battery electronic device according to claim 3, wherein the control circuit is further configured to control the multi-battery electronic device to enter the first load reduction stage when the discharge current of any one of the plurality of batteries is greater than the current upper limit;

wherein the control circuit is further configured to control the multi-battery electronic device to enter the second load reduction stage when the discharge current of any one of the plurality of batteries is greater than a second current upper limit; and wherein the current upper limit is less than the second current upper limit.

5. The multi-battery electronic device according to claim 1, wherein the control circuit is connected to a plurality of loads, and the control circuit is configured to control an operating frequency of each of the plurality of loads.

6. The multi-battery electronic device according to claim 1, wherein:

when the control circuit determines that the discharge current of any one of the plurality of batteries is greater than the current upper limit, the control circuit proceeds to determine whether any one of the plurality of batteries is greater than a second current upper limit;

when the control circuit determines that the discharge current of any one of the plurality of batteries is greater than the current upper limit but not greater than the second current upper limit, the control circuit controls the multi-battery electronic device to enter a first load reduction stage of the load reduction mode; and when the control circuit determines that the discharge current of any one of the plurality of batteries is greater than the current upper limit and greater than the second current upper limit, the control circuit controls the multi-battery electronic device to enter a second load reduction stage of the load reduction mode different than the first load reduction stage.

7. A protection method of a multi-battery electronic device, comprising:

configuring a control circuit to perform following:

detecting battery status of a plurality of batteries by a plurality of battery detectors, respectively;

determining whether or not a current capacity difference between any two of the plurality of batteries is greater than a capacity difference threshold;

controlling, when the current capacity difference between any two of the plurality of batteries is determined to be greater than the capacity difference threshold, the multi-battery electronic device to enter a load reduction mode;

determining whether or not a discharge current of any one of the plurality of batteries is greater than a current upper limit after determining whether or not the current capacity difference between any two of the plurality of batteries is greater than the capacity difference threshold;

controlling, when the discharge current of any one of the plurality of batteries is greater than the current upper limit, the multi-battery electronic device to enter the load reduction mode;

determining whether or not a temperature of any one of the plurality of batteries is not within a temperature protection range after determining whether the discharge current of any one of the plurality of batteries is greater than the current upper limit; and controlling, when the temperature of any one of the plurality of batteries is not within the temperature protection range, the multi-battery electronic device to enter the load reduction mode;

wherein the load reduction mode comprises changing an operating frequency of at least some of a load.

8. The protection method according to claim 7, further comprising:

determining whether or not the discharge current is greater than a second current upper limit when the discharge current is greater than the current upper limit;

wherein the second current upper limit is greater than the current upper limit, and the multi-battery electronic device remains in a normal mode when the discharge currents of the plurality of batteries are not greater than the current upper limit;

wherein when the discharge current of any one of the plurality of batteries is greater than the current upper limit but not greater than the second current upper limit, the control circuit controls the multi-battery electronic device to enter a first load reduction stage of the load reduction mode; and wherein when the discharge current of any one of the plurality of batteries is greater than the second current upper limit, the control circuit controls the multi-battery electronic device to enter a second load reduction stage of the load reduction mode.

9. A multi-battery electronic device, comprising:

a plurality of batteries;

a plurality of battery detectors connected to the plurality of batteries, respectively, wherein each of the plurality of battery detectors comprises a current detection circuit configured to detect a discharge current of a corresponding one of the plurality of batteries; and a control circuit, wherein the control circuit is configured to detect battery status of the plurality of batteries by the plurality of battery detectors;

wherein, when the control circuit determines that a current capacity difference between any two of the plurality of batteries is greater than a capacity difference threshold, the control circuit controls the multi-battery electronic device to enter a load reduction mode;

wherein when the control circuit determines that the discharge current of any one of the plurality of batteries is greater than a first current upper limit, the control circuit proceeds to determine whether any one of the plurality of batteries is greater than a second current upper limit;

wherein when the control circuit determines that the discharge current of any one of the plurality of batteries is greater than the first current upper limit but not greater than the second current upper limit, the control circuit controls the multi-battery electronic device to enter a first load reduction stage of the load reduction mode; and wherein when the control circuit determines that the discharge current of any one of the plurality of batteries is greater than the first current upper limit and greater than the second current upper limit, the control circuit controls the multi-battery electronic device to enter a second load reduction stage of the load reduction mode different than the first load reduction stage; and wherein the load reduction mode comprises changing an operating frequency of at least some of a load.

10. The multi-battery electronic device according to claim 9, further comprising a central processing unit and a video graphics adapter;

wherein, when the multi-battery electronic device enters the load reduction mode, an operating frequency of at least one of the central processing unit or the video graphics adapter is reduced.

11. The multi-battery electronic device according to claim 9, further comprising a central processing unit and a video graphics adapter;

wherein an operating frequency of the video graphics adapter is reduced in the first load reduction stage, and the operating frequency of the video graphics adapter and an operating frequency of the central processing unit are reduced in the second load reduction stage.

12. The multi-battery electronic device according to claim 9, wherein the control circuit is connected to a plurality of loads, and the control circuit is configured to control an operating frequency of each of the plurality of loads.

13. The multi-battery electronic device according to claim 9, wherein each of the plurality of battery detectors comprises a temperature detection circuit configured to detect a temperature of a corresponding one of the plurality of batteries.

14. The multi-battery electronic device according to claim 13, wherein, when the control circuit determines that the temperature of any one of the plurality of batteries is not within a temperature protection range, the control circuit controls the multi-battery electronic device to enter the load reduction mode.

15. The multi-battery electronic device according to claim 13, wherein, when the control circuit determines that the temperature of any one of the plurality of batteries is lower than a specified temperature protection range, the control circuit controls the multi-battery electronic device to enter the load reduction mode.

16. The multi-battery electronic device according to claim 13, wherein, when the control circuit determines that the temperature of any one of the plurality of batteries is higher than a specified temperature protection range, the control circuit controls the multi-battery electronic device to enter the load reduction mode.

17. The multi-battery electronic device according to claim 9, wherein each of the plurality of battery detectors comprises a capacity detection circuit configured to detect a current capacity of a corresponding one of the plurality of batteries.

* * * * *